United States Patent [19]
Clabburn

[11] 3,898,369
[45] Aug. 5, 1975

[54] METAL COATED HEAT-RECOVERABLE ARTICLES

[76] Inventor: Robin J. T. Clabburn, No. 1 Stonefield Dr., Highworth, Wiltshire, England

[22] Filed: Dec. 21, 1973

[21] Appl. No.: 427,140

Related U.S. Application Data
[63] Continuation of Ser. No. 803,059, Feb. 27, 1969, abandoned.

[30] Foreign Application Priority Data
Feb. 27, 1968 United Kingdom................. 9345/68

[52] U.S. Cl..................... 174/36; 117/7; 117/47 R; 117/160 R; 138/145; 156/86; 161/402; 161/411; 174/73 R; 174/DIG. 8; 204/20; 264/230
[51] Int. Cl........ H05k 9/00; C23c 3/00; C23b 5/62
[58] Field of Search............ 174/DIG. 8, 35 MS, 36, 174/73 R, 73 SC, 74 R, 74 A, 75 R, 78, 84 R, 87, 90, 94 R; 29/447; 117/7, 47 R, 138.8 R, 160 R; 138/141, 143, 145, 146; 156/84–86; 161/216, 402, 411, 412; 264/230

[56] References Cited
UNITED STATES PATENTS

| | | | |
|---|---|---|---|
| 2,713,383 | 7/1955 | Kennedy | 156/86 |
| 2,942,300 | 6/1960 | Masters | 264/134 |
| 3,104,985 | 9/1963 | Williams et al. | 427/121 |
| 3,116,170 | 12/1963 | Williams et al. | 136/86 |
| 3,143,738 | 7/1964 | Bigelow | 29/600 |
| 3,210,460 | 10/1965 | Suelmann | 174/73 R |
| 3,222,218 | 12/1965 | Beltzer et al. | 188/318 |
| 3,235,473 | 2/1966 | Le Duc | 204/30 |
| 3,253,618 | 5/1966 | Cook | 174/DIG. 8 UX |
| 3,317,655 | 5/1967 | Oatess et al. | 174/73 R |

FOREIGN PATENTS OR APPLICATIONS

| | | |
|---|---|---|
| 1,422,299 | 11/1965 | France |
| 1,254,933 | 11/1967 | Germany |
| 1,254,934 | 11/1967 | Germany |
| 743,281 | 1/1956 | United Kingdom |
| 834,744 | 5/1960 | United Kingdom |
| 898,138 | 6/1962 | United Kingdom |
| 1,045,086 | 10/1966 | United Kingdom |
| 1,083,190 | 9/1967 | United Kingdom |
| 1,164,459 | 9/1969 | United Kingdom |

*Primary Examiner*—Laramie E. Askin

[57] ABSTRACT

This invention relates to a heat recoverable article having a coating of metal on its surface whereby the electrical resistance of the article is decreased and the process of forming said articles by coating the surface with metal.

12 Claims, 1 Drawing Figure

PATENTED AUG 5 1975            3,898,369
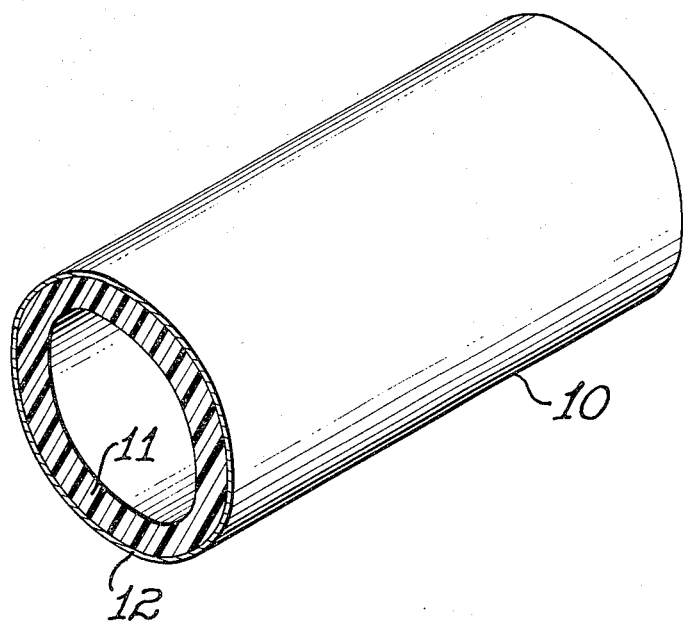
INVENTOR.
ROBIN J.T. CLABBURN
BY Lyon & Lyon
ATTORNEY'S

METAL COATED HEAT-RECOVERABLE ARTICLES

CROSS REFERENCE TO RELATED APPLICATION

This is a continuation of copending application Ser. No. 803,059 filed Feb. 27, 1969 and now abandoned.

BACKGROUND OF THE INVENTION

This invention relates to heat recoverable materials.

Materials to which may be imparted the property of heat recoverability, especially heat shrinkability, are well known. There may be mentioned, for example, polyethylene, polyvinyl chloride and polyvinylidene fluoride, which have been cross-linked, for example, by irradiation, and polytetrafluoroethylene. These materials may contain minor amounts of fillers, for example, pigments and flame retardants.

For most practical purposes shaped structures made from these materials are heated to a temperature above their crystalline melting point, expanded and allowed to cool under a pressure maintaining their expanded form. On subsequently being heated to their crystalline melting point these expanded structures will recover to their original form and are thus heat shrinkable.

It has already been proposed to metal plate both thermosetting plastics and thermoplastics materials. Plating is, in general, applied for decorative or electrical purposes and, according to the finish required, the metal is deposited on the surface by electrical, chemical, vapour or vacuum deposition. Up to now, however, plating has only been attempted on rigid materials because a metal coating applied to a flexible material would be expected to fracture and/or flake away on flexing.

The heat recoverable materials described above are insulating by nature and their electrical resistance cannot be reduced to below about 100 ohms by the incorporation of conducting fillers without completely destroying their other useful properties, for example, their flexibility and mechanical strength. Because the surface area of most heat-shrinkable materials decreases by 50% or more during shrinkage it would also be expected that an attempt to plate the materials would only result, on the one hand, in the fracture and flaking away of a thin metal film or, on the other hand, in a reduction of shrinkage if the metal film was strong. Thus, although it would obviously be possible to plate a thin metal film onto an expanded heat-recoverable material so that, for example, its electrical resistance was lowered it would be expected that on shrinking the resistance would increase to a value of hundreds of ohms due to the fracture and flaking away of the plating.

DESCRIPTION OF THE PREFERRED EMBODIMENTS OF THE INVENTION

This invention is based on the surprising discovery that it is possible to plate heat-recoverable materials so that their electrical resistance remains low even on recovery.

The objects and advantages of the invention further appear from the detailed description which follows and from the accompanying drawing (not to scale) which pictorially depicts an electrically conductive article 10 formed from heat recoverable tubing 11 bearing a thin, continuous, electrically-conductive metal film 12.

The present invention accordingly provides a material which is heat-recoverable and at least one surface of which is coated with a thin film of a metal.

The coating is preferably applied to the material in its heat-recoverable, for example, expanded, form but, if desired, a material to which the property of heat-recoverability can be imparted is coated and is then deformed under heat and pressure and cooled while maintaining the pressure to make the coated material heat-recoverable.

If the material is to be formed into heat-recoverable shaped structures the coating process is advantageously performed after the heat-recoverable shaped structures have been formed.

The heat-recoverable material may contain one or more fillers or other additives. The material itself may be one of the already known heat-recoverable materials. Particularly suitable heat-recoverable materials include the heat-recoverable polymeric materials including one of the materials described above.

All the methods hitherto proposed for applying a metal coating to the surfaces of rigid materials may be used to coat the heat-recoverable materials in the process of the present invention. It is possible, for example, to coat the materials with aluminum by a vacuum deposition process. Vapour deposition, for example, by the thermal decomposition of nickel carbonyl as described in U.S. Pat. No. 2,881,094, may also be used although the necessity for the materials to be at relatively high temperatures, for example 170°C, during coating by vapour deposition gives the method a somewhat limited application to the coating of heat-recoverable materials.

Metal platings of, for example, copper, nickel, gold tin, cadmium, chromium and silver may be applied by electrolytic or electroless deposition.

The method of electroless deposition, which is especially favorable, generally comprises the following steps.

a. Etching or roughening the surface of the material. Most heat-recoverable materials can be satisfactorily etched by using a chromic acid etch (concentrated $H_2SO_4$/chromium trioxide solution at a temperature of about 40°C).

Chromic acid etch does not work with polyvinylidene fluoride, however, a sodium/naphthalene complex in tetrahydrofuran at about room temperature is preferably used.

The treatment with chromic acid etch generally lasts about 15 seconds but with the sodium/naphthalene complex a longer exposure time of about 10 minutes is necessary.

b. Sensitizing the etched material. This is generally done using a dilute weakly acidic $Sn^{**}$ solution for a period of 1 or 2 minutes at room temperature or slightly above.

c. Seeding the material. The material is, for example, exposed for a period of from 1 to 2 minutes to a dilute weakly acidic solution of a noble metal chloride, for example, platinum chloride, auric chloride or, especially, palladium chloride.

d. Plating the material. This may be done by immersing the material which has been treated by steps (a), (b) and (c), for a period of from 5 to 30 minutes at room temperature or slightly above, in a plating solution containing a salt of the metal to be plated. When the material is to be plated with copper, for example, a modified Fehling's solution may be employed.

If it is so desired, the layer of plating produced by an electroless deposition method of the type described above may be augmented by an additional layer produced by an electrolytic method. It is also possible to produce satisfactory plating by an electrolytic process alone.

The plated heat-recoverable materials and shaped structures of the present invention have many important applications. They are especially useful in the production of electrically-conducting heat shrinkable shields for use in the termination of screened cables for earth continuity and effective continuation of the overall screen.

The invention is particularly suitable for use with heat-recoverable tubular articles. Such tubular articles include those with closed ends and cross sections which are unsymmetrical or which may vary in shape along the length of the tube.

It will be realized that it is possible to produce a wide range of electrical conductivity in the plated materials, for example, from 0.01 to $10^6$ ohm/cm. It is often desirable to have a resistance of less than 10 ohm/cm., which is equivalent to 2 ohm/square. For many applications, however, a resistance of between 10 and $10^6$ ohms/cm is satisfactory. The thickness of the plating is in general in the range of from 0.0001 inch to 0.001 inch when using an electroless deposition method of the type described above.

The following Examples illustrate the invention:

EXAMPLE 1

A heat-shrinkable, chemically cross-linked, flame retarded, molded polyethylene boot, in its expanded form, was given a surface plating of copper by the following method.

1. The molding was totally immersed in a solution of chromium trioxide and sodium dichromate in concentrated sulphuric acid. The temperature of this etching solution was 40°C and the molding was immersed for 15 seconds. Immediately following this etch the molding was washed thoroughly in cold distilled water.

2. The molding was then immersed in a sensitizing solution of the following composition:

| Stannous chloride 1.3 g. | ) | made up to 250 ml. with |
| Hydrochloric acid 10 ml. | ) | distilled water | for 90 seconds at room temperature. The molding was then thoroughly washed in distilled water.

3. The sensitizing stage was followed by a seeding process. This was achieved by immersion in the following solution:

| Palladium chloride 0.05 g. | ) | made up to 1 litre with |
| Hydrochloric acid 1 ml. | ) | distilled water |

The solution was at room temperature and the molding was immersed for 120 seconds. Following seeding the molding was again washed in distilled water.

4. The molding was then immersed in a plating solution, which had the following composition:

| Copper sulphate | 10 g. | ) | |
| Sodium potassium tartrate | 25 g. | ) | made up to 1 litre |
| Sodium hydroxide | 10 g. | ) | with distilled |
| Formaldehyde solution (37%) | 10 ml. | ) | water |

The plating solution was at room temperature and the part was immersed for 15 minutes.

The plated part was removed and washed thoroughly in distilled water.

Results:
End to end resistance of part before shrinking = 0.16 ohm.
End to end resistance of part after shrinking = 0.81 ohm.

EXAMPLE 2

The item plated was a heat-shrinkable molded part as in example 1. The metallic coating applied was silver. The molding was treated as in steps (2) to (3) of Example 1 and then plated as follows:

a. 5 g. of silver nitrate were dissolved in 300 ml. of distilled water and dilute ammonium hydroxide solution added until the precipitate which forms initially was almost dissolved. The solution was then filtered and made up to 500 ml. with distilled water. One gram of silver nitrate was then dissolved in a small quantity of water and poured into 500 ml. of boiling distilled water, 0.83 g. of Rochelle Salts (sodium potassium tartrate) were dissolved in a small quantity of water and added to the boiling solution. The grey precipitate which formed was filtered off and the solution made up to 500 ml.

The molding was placed in a glass container and a mixture of equal volumes of the two solutions described above was added. A coating of silver was obtained after about 1 hour.

Results:
Resistances were similar to those for copper (0.2Ω before shrinking, 0.9Ω after shrinking), but adhesion was poor.

EXAMPLE 3

The item plated was an irradiated heat-shrinkable polyvinylidene fluoride tube. The metallic coating applied was copper. The method used was as follows:

1. The tubing was first etched for 10 minutes at room temperature in a sodium-naphthalene complex, in tetra hydrofuran which had been prepared as follows:

10 g. of naphthalene dissolved in 100 ml. of sodium dried tetrahydrofuran. 3 g. of clean sodium added and mixture stirred until formation of complex is indicated by solution turning black. The tubing was then washed in di-ethyl ether and then processed as in Example 1 steps (2) – (4).

Results:

| Expanded dimensions of tubing: | |
|---|---|
| Internal diameter | = 0.4" |
| Wall thickness | = 0.003" |
| Recovered dimensions: | |
| Internal diameter | = 0.15" |
| Wall thickness | = 0.0009" |
| Resistance before shrinking | = 0.68–1.5" |
| Resistance after shrinking | = 1.8–1.5" |

EXAMPLE 4

The item plated was a heat-shrinkable neoprene molded part of the same dimensions as in Example 1 and 2. The metallic coating applied was copper. The part was treated in the same manner as the polyethylene molding in Example 1.

Results:

End to end resistance of part before shrinking = 0.3 Ω
End to end resistance of part after shrinking = 1.1 Ω

Coating thickness variations may produce corresponding variations in the shrinkage and resistance.

EXAMPLE 5

A heat-shrinkable molded part as described in Example 1 was etched in a chromic acid/sulphuric acid mixture as described in paragraph (1) of Example 1, and then washed in cold distilled water and dried.

The part was then placed in a vacuum chamber containing a centrally situated tungsten element on which was placed aluminum wire. The pressure in the chamber was lowered to $10^{-4}$ torr and the tungsten element was electrically heated. Aluminum evaporated from the wire and coated the surfaces of the molded part.

After coating, the molded part was removed from the chamber and further coated with a layer of lacquer to protect the aluminum film. The resistance between the ends of the coated part before shrinking was 3 ohms. After shrinking this resistance increased to 4.5 ohms.

It is possible to treat a number of molded parts simultaneously in the vacuum chamber.

I claim:

1. A tubular heat recoverable polymeric article having a thin, continuous, electrically conductive metal film on its surface, said metal film adhering to the article so that upon recovery of the article and resultant decrease of the surface area thereof, the film adheres to the surface to maintain electrical conductivity of the article.

2. An article according to claim 1 wherein the said film is from 0.0001 to 0.001 inch in thickness.

3. An electrically conductive cylindrical heat-shrinkable shield for termination of screened cables according to claim 2.

4. The article of claim 2 wherein the metal is selected from the group consisting of copper, nickel, silver, gold, tin, cadmium, chromium and aluminum.

5. An article according to claim 1 wherein the said film imparts to the article electrical resistance less than about 10 ohms per centimeter.

6. An article according to claim 1 wherein, upon recovery, the resultant the decrease of at least a portion of said surface area is at least 50 percent.

7. An article according to claim 1 wherein the said polymeric article comprises polyethylene.

8. An article according to claim 1 wherein the metal film is copper.

9. An article according to claim 1 wherein the metal film is silver.

10. An article according to claim 1 having one such metal film on a first surface of the article and a second such metal film on another surface thereof.

11. A heat recoverable polymeric article having a thin, continuous, electrically conductive metal film on its surface, said metal film adhering to the article so that upon recovery of the article and resultant decrease of the surface area thereof, the film adheres to the surface to maintain electrical conductivity of the article, the decrease resulting from heat recovery of at least a portion of said surface area being at least 50 percent of the surface area of said portion.

12. An article according to claim 11 having one such metal film on a first surface of the article and a second such metal film on another surface thereof.

* * * * *